(12) United States Patent
Borgemenke et al.

(10) Patent No.: US 7,131,707 B2
(45) Date of Patent: Nov. 7, 2006

(54) COMPACT CONTROLLED BRAKING SYSTEM

(75) Inventors: Daniel N. Borgemenke, Springboro, OH (US); Joseph Allen Elliott, Plymouth, MI (US); Earl Wayne Lloyd, Lebanon, OH (US); Jerry Lee Newton, Richmond, IN (US); Steven F. Pfeifenberger, Shelby Township, MI (US); Dewey Frank Mort, Sun City, AR (US); David F. Reuter, Beavercreek, OH (US)

(73) Assignee: Delphi Technolgies, Inc., Troy, MI (US)

( * ) Notice: Subject to any disclaimer, the term of this patent is extended or adjusted under 35 U.S.C. 154(b) by 0 days.

(21) Appl. No.: 11/089,825

(22) Filed: Mar. 25, 2005

(65) Prior Publication Data

US 2005/0218715 A1  Oct. 6, 2005

Related U.S. Application Data

(60) Provisional application No. 60/556,318, filed on Mar. 25, 2004.

(51) Int. Cl.
*B60T 8/40* (2006.01)
(52) U.S. Cl. ............................. 303/116.4; 303/119.3; 303/DIG. 10
(58) Field of Classification Search ............. 303/110.4, 303/119.3, DIG. 10
See application file for complete search history.

(56) References Cited

U.S. PATENT DOCUMENTS 5,529,389 A * 6/1996 Sekiguchi ................. 303/116.4
5,688,028 A * 11/1997 Kohno et al. ............. 303/116.4
6,679,568 B1 * 1/2004 Schafer et al. ........... 303/119.3

* cited by examiner

*Primary Examiner*—Thomas Williams
(74) *Attorney, Agent, or Firm*—Scott A. McBain

(57) ABSTRACT

A compact controlled braking system including a hydraulic control unit having a first housing and a motor positioned within the first housing and an electronic control unit connected to the hydraulic control unit, the electronic control unit having a second housing, wherein at least a portion of the motor is received within the second housing.

3 Claims, 3 Drawing Sheets

COMPACT CONTROLLED BRAKING SYSTEM

This application claims priority from U.S. Provisional Patent App. No. 60/556,318 filed on Mar. 25, 2004, the entire contents of which are incorporated herein by reference.

BACKGROUND

The present application relates to anti-lock braking systems and, more particularly, to hydraulic modulator systems for anti-lock braking systems.

Anti-lock braking systems are used in vehicles to prevent one or more wheels from locking during the application of braking force, thereby allowing a driver to maintain control of the vehicle. A typical anti-lock braking system includes wheel speed sensors, an electronic control unit ("ECU") and a valve body such as a hydraulic control unit ("HCU"). The ECU is integrated with the HCU to form a hydraulic modulator or electro-hydraulic control unit ("EHCU").

The HCU may include a motor for pumping hydraulic fluid, accumulators for storing accumulated hydraulic fluid and valves having valve stems for directing hydraulic fluid to the brakes. The ECU may include a processor for receiving signals from the speed sensors and solenoid coils corresponding to each valve stem for actuating the valves according to command signals generated by the processor. The ECU may be integrated with the HCU such that the coils contact the valve stems, thereby forming the EHCU.

The ECU may monitor the rotation of the wheels based on signals from the speed sensors. When a wheel is identified as rotating at a different speed than the other wheels, the ECU signals the coils to actuate the appropriate valves, thereby controlling the braking force applied to the identified wheel.

EHCUs used on motorcycles and other smaller vehicles are typically adapted from passenger cars due to the high cost of developing customized systems. While these systems are able to meet the performance needs of these vehicles, they are not the most efficiently sized systems. Typical EHCUs have a motor extending from the HCU and mounted externally of the ECU, thereby occupying valuable space. Additional disadvantages of such configurations include the need to seal the motor separately to prevent damage from environmental factors, the requirement of an electrical connection between the motor and the ECU that is traditionally an external connection or a drilled passage through the HCU that occupies valuable space and the need to machine the aluminum body of the HCU on the face opposite the valves and ECU.

Accordingly, there is a need for a hydraulic modulator without the above-mentioned disadvantages that makes efficient use of space such that it may be used with motorcycles and other small vehicles in which space is a premium.

SUMMARY

In one aspect, the compact controlled braking system includes a hydraulic control unit having a first housing, a motor positioned within the first housing and an electronic control unit connected to the hydraulic control unit, the electronic control unit having a second housing, wherein at least a portion of the motor is received within the second housing.

In a second aspect, the compact controlled braking system includes a hydraulic control unit having a first housing, an electronic control unit connected to the hydraulic control unit, the electronic control unit having a second housing, and a motor, wherein at least a first portion of the motor is received within the first housing and at least a second portion of the motor is received within the second housing.

In a third aspect, a method for reducing the size of a hydraulic modulator is provided. The method includes the steps of providing a hydraulic control unit having a first housing, a motor and a plurality of valves, providing an electronic control unit having a second housing and a plurality of solenoid coils, removing unnecessary solenoid coils from the electronic control unit to create a recess in the second housing, and connecting the hydraulic control unit to the electronic control unit such that a portion of the motor is received within the recess. Those skilled in the art should understand that the steps need not be performed in sequential order.

Other aspects of the compact controlled braking system will be apparent from the following description, the accompanying drawings, and the appended claims.

DETAILED DESCRIPTION

For illustrative purposes, the following discussion will be directed to a motorcycle (not shown) having an EHCU that utilizes a two-channel ABS HCU. It should be understood that the compact controlled braking system is not limited to motorcycles, but rather may be applied to other small vehicles, such as powersports, mini-cars, snowmobiles and single drive vehicles, regardless of the number of wheels. Furthermore, the compact controlled braking system is not limited to a two-channel ABS HCU, as other HCUs, including, but not limited to, the following may be used with the compact controlled braking system: 1-channel ABS (front or rear), 2-channel ABS consisting of two 1-channel ABS systems, 2-channel ABS/1-channel traction control system ("TCS"), 3-channel ABS/2-channel TCS, 2-channel ABS/2-channel TCS/TRAXXAR (TRAXXAR is a trademark of Delphi Technologies, Inc. for chassis systems and components) and 4-channel ABS.

Figure 1:
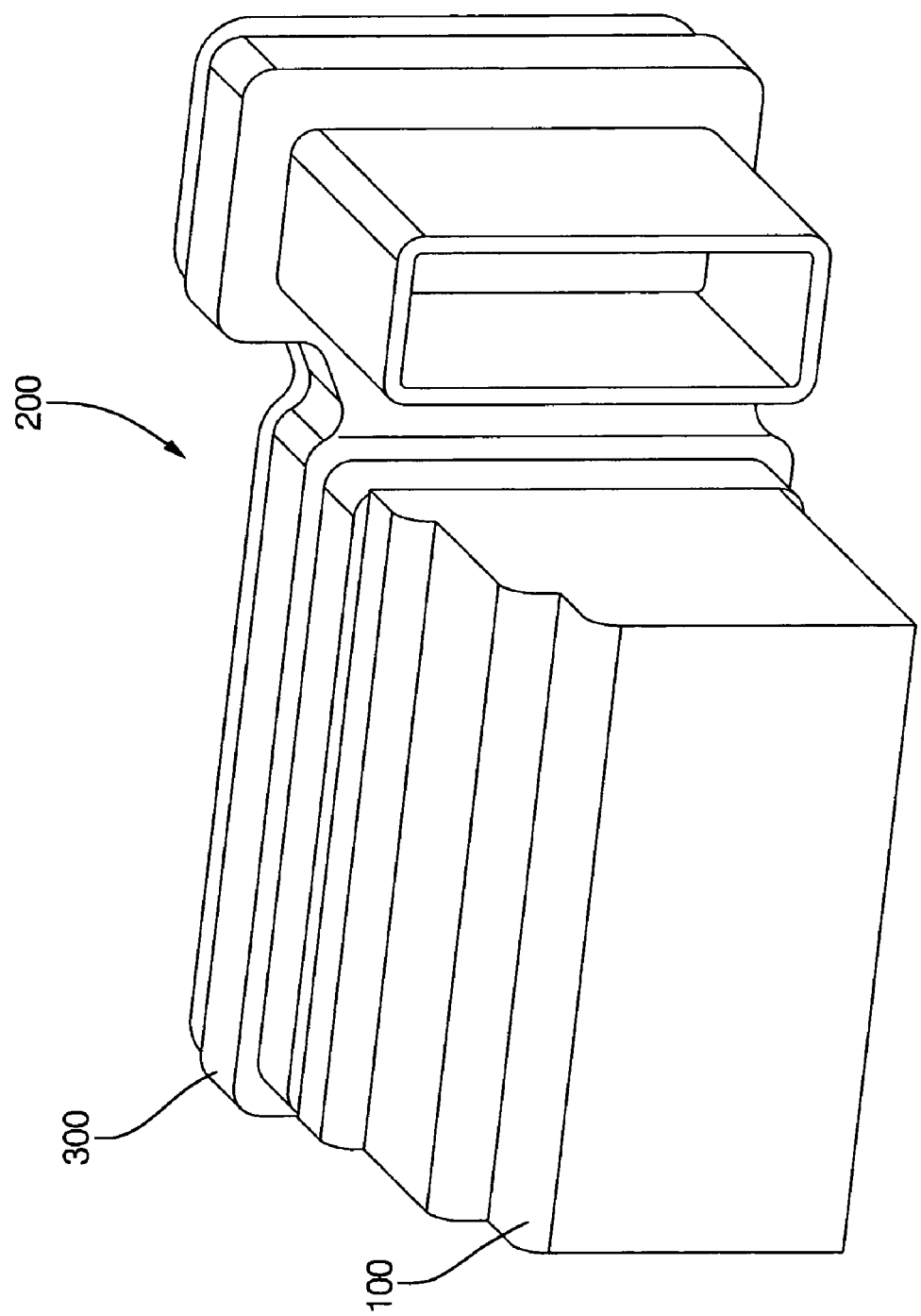
FIG. 1 is a front perspective view of one aspect of a compact controlled braking system.

As shown in FIG. 1, the EHCU (or hydraulic modulator) of the compact controlled braking system, generally designated 200, includes a 2-channel ABS HCU 100 and an eight valve ECU 300.

Figure 2:
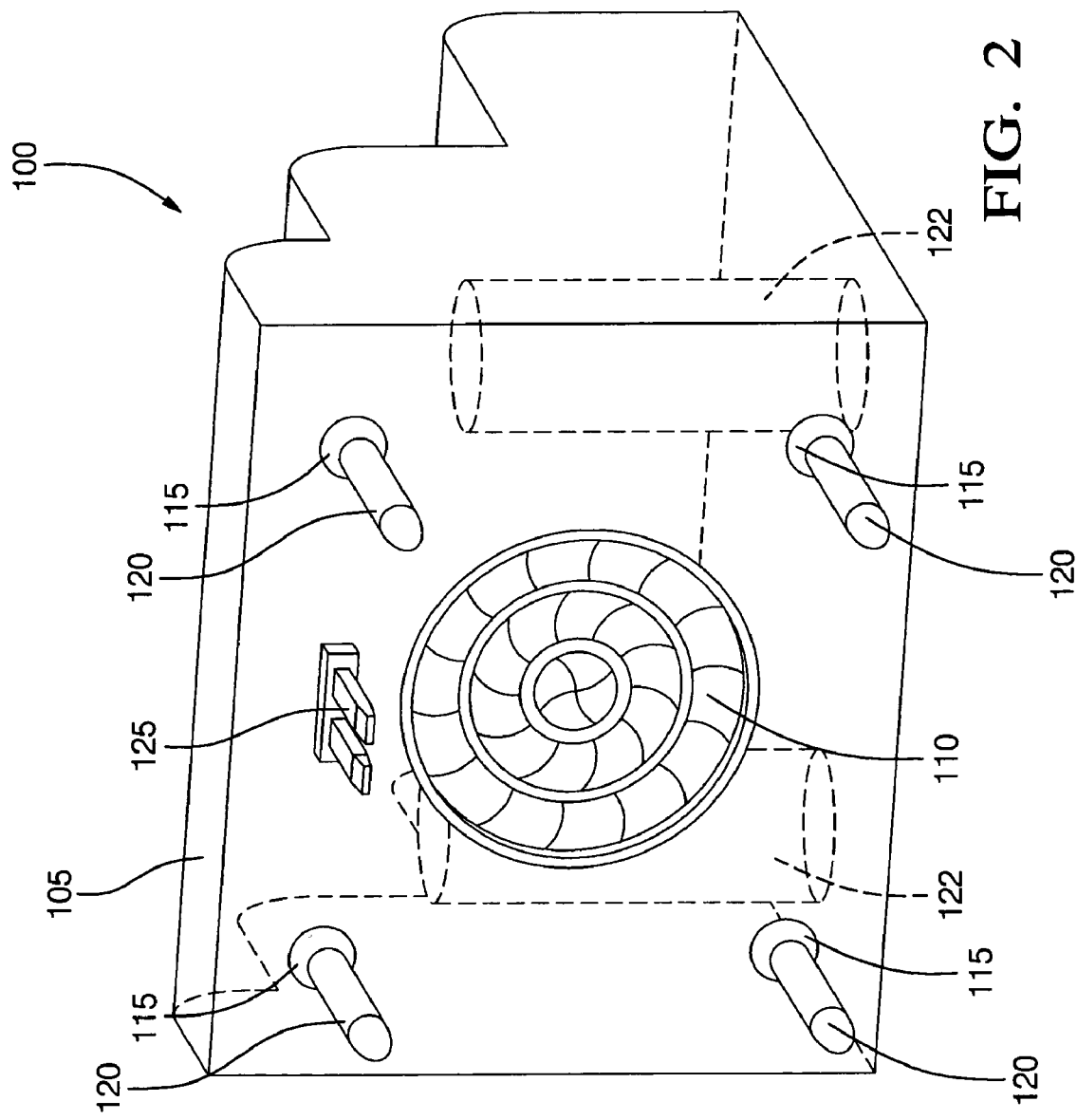
FIG. 2 is a front perspective view of a 2-channel ABS HCU of the compact controlled braking system of FIG. 1.

As shown in FIG. 2, the HCU 100 may include a housing or body 105, a motor 110 for pumping hydraulic fluid, an electrical connector 125 for supplying power to the motor 110, four valves 115, each having a valve stem 120 and accumulators 122 for storing accumulated hydraulic fluid. A typical 2-channel ABS HCU for automobiles may have eight, rather than four, valves. However, a motorcycle braking system only has two braking channels. Therefore, only four valves are necessary, allowing for four of the valves to be removed, thereby freeing up additional space within the body 105.

Figure 3:
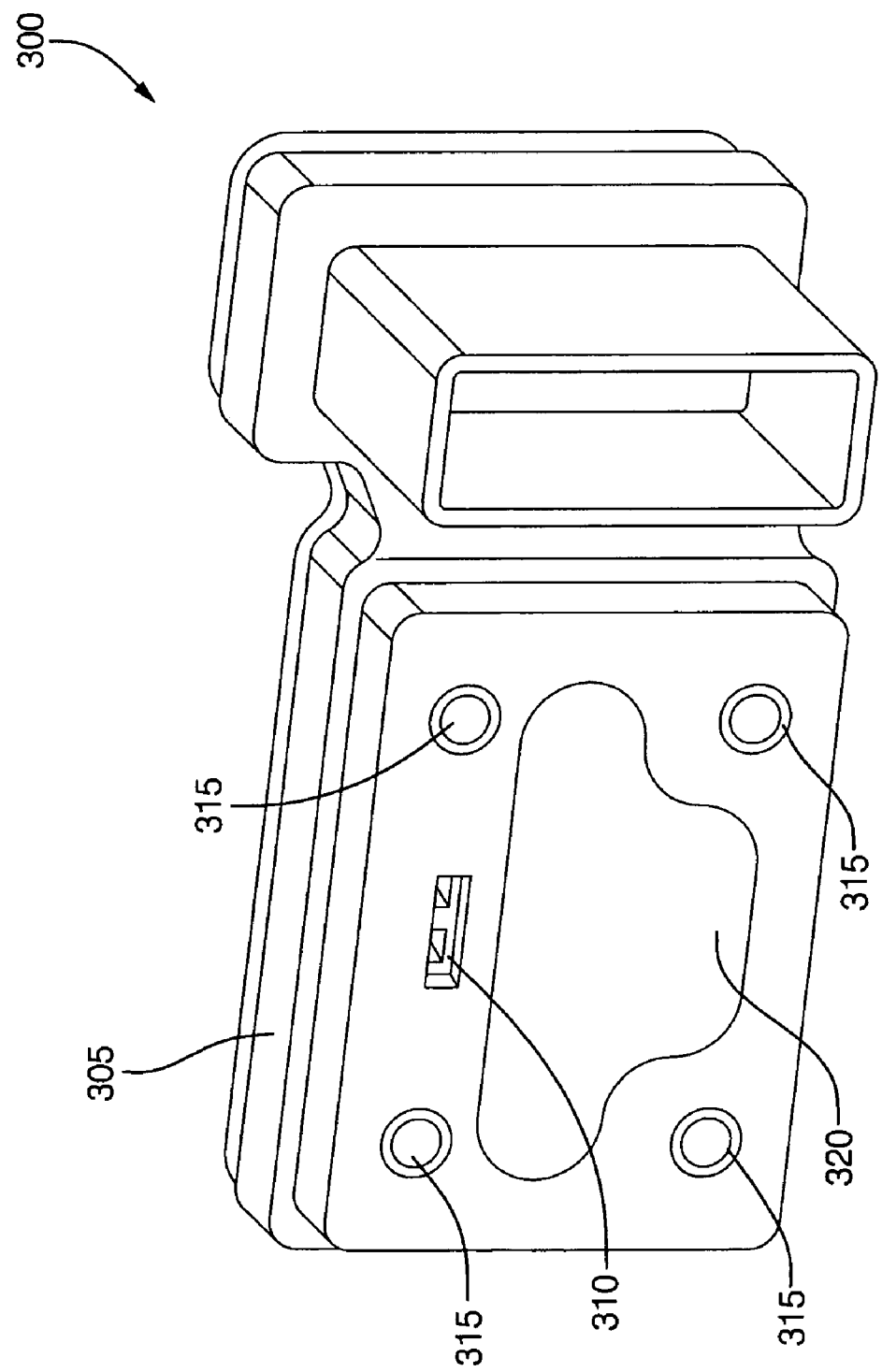
FIG. 3 is a front perspective of an ECU of the compact controlled braking system of FIG. 1.

As shown in FIG. 3, the ECU 300 may include a housing or body 305, an electrical receptacle 310, four solenoid coils 315 for actuating the valve stems 120 on the HCU 100 and a processor (not shown) for receiving signals from the speed sensors positioned at the wheels of the motorcycle and controlling the solenoid coils 315 accordingly.

The ECU 300 may be a standard ECU such as a standard 7.4 ABS electronic control unit available from Siemens and typically may include eight to twelve coils. However, the ECU 300 of the compact controlled braking system may, for example, only include four coils 315, rather then the standard eight to twelve coils, due to the fact that only four coils are necessary to correspond with the four valves 115 in the HCU 100. Thus, by removing unnecessary coils from the ECU 300, a recess 320 is created within the ECU body 305 such that a portion of the motor 110 may be received within the recess 320.

The additional space created by removing the unnecessary valves and coils from the body 105 and body 305 may allow for the motor 110 to be packaged within the body 305 of the ECU 300. Furthermore, the additional space within body 105 may allow for the drilling and packaging of traditional accumulators within the body 105.

As shown in FIG. 1, when the HCU 100 is mated with the ECU 300, the four coils 315 may contact the four valve stems 115, the electrical connector 125 may be received within the electrical receptacle 310, and a portion of the motor 110 may be received within the recess 320, thereby forming a hydraulic modulator (or EHCU) 200 occupying less space than a hydraulic modulator assembled without housing a portion of the motor 110 with the ECU body 305. In one aspect, the hydraulic modulator 200 may be two-thirds the size of a prior art hydraulic modulator. In another aspect, the space created by removal of the unnecessary valves from the HCU 100 allows the accumulators to be housed within the HCU body 105 such that the accumulators do not occupy valuable space in the ECU 300.

Accordingly, a compact hydraulic modulator 200 may be obtained without any board or mold changes necessary to existing ECUs. Furthermore, by placing a portion of the motor 110 within a recess 320 within the ECU body 305, the motor 110 may be safely shielded from environmental factors that may damage the motor 110. Another advantage is that the electrical connector 125 of the motor 110 easily attaches to the electrical receptacle 310 of the ECU 300.

Based on the foregoing description, those skilled in the art will appreciate that various HCUs having various numbers of valves and valve stems may be used with the compact controlled braking system. Various HCUs can be modified by removing unnecessary valves and mating the modified HCU with an ECU in which unnecessary coils have been removed, thereby creating a recess 320 in the ECU to accommodate, at least, a portion of the motor 110.

The compact controlled braking system allows for the utilization of ECUs 300 and HCUs 100 that are currently available for passenger cars, without the need for, and associated costs of, custom designed ECUs and HCUs. By creating space within the ECU housing 305 for receiving a portion of the HCU motor 110, the size of the overall hydraulic modulator 200 is drastically reduced.

Although the compact controlled braking system is shown and described with respect to certain aspects, it is obvious that modifications will occur to those skilled in the art upon reading and understanding the specification. The compact controlled braking system includes all such modifications and is limited only by the scope of the claims.

What is claimed is:

1. A method for reducing the size of a hydraulic modulator comprising the steps of:
   providing a hydraulic control unit having a first housing, a motor and a plurality of valves;
   providing an electronic control unit having a second housing and a plurality of solenoid coils;
   removing unnecessary ones of said solenoid coils from said electronic control unit to create a recess in said second housing; and
   connecting said hydraulic control unit to said electronic control unit such that a portion of said motor is received within said recess.

2. The method of claim 1 further comprising the step of removing unnecessary ones of said valves from said hydraulic control unit to create a recess in said first housing.

3. The method of claim 2 further comprising the step of providing accumulators, wherein said accumulator are positioned within said recess in said first housing.

* * * * *